(12) United States Patent
Han et al.

(10) Patent No.: US 11,439,934 B2
(45) Date of Patent: Sep. 13, 2022

(54) CAPTURE DEVICE FOR PURIFYING AIR, PURIFICATION DEVICE AND AIR PURIFIER

(71) Applicants: Guangdong Midea White Home Appliance Technology Innovation Center Co., Ltd., Foshan (CN); Midea Group Co., Ltd., Foshan (CN)

(72) Inventors: Yunqing Han, Foshan (CN); Chubin Ou, Foshan (CN); Tongsheng Wang, Foshan (CN); Hui Zhang, Foshan (CN)

(73) Assignees: GUANGDONG MIDEA WHITE HOME APPLIANCE TECHNOLOGY INNOVATION CENTER CO., LTD., Foshan (CN); MIDEA GROUP CO. LTD., Foshan (CN)

( * ) Notice: Subject to any disclaimer, the term of this patent is extended or adjusted under 35 U.S.C. 154(b) by 141 days.

(21) Appl. No.: 17/145,129

(22) Filed: Jan. 8, 2021

(65) Prior Publication Data

US 2021/0129062 A1 May 6, 2021

Related U.S. Application Data

(63) Continuation of application No. PCT/CN2018/122107, filed on Dec. 19, 2018.

(30) Foreign Application Priority Data

Aug. 31, 2018 (CN) .......................... 201811013330.9

(51) Int. Cl.
*B01D 46/00* (2022.01)
*B01D 33/00* (2006.01)
(Continued)

(52) U.S. Cl.
CPC ............. *B01D 45/14* (2013.01); *B01D 33/15* (2013.01); *B01D 33/42* (2013.01); *B01D 47/02* (2013.01);
(Continued)

(58) Field of Classification Search
CPC ........ B01D 33/15; B01D 33/42; B01D 45/14; B01D 47/06
See application file for complete search history.

(56) References Cited

U.S. PATENT DOCUMENTS 5,826,807 A 10/1998 Csendes
6,044,977 A 4/2000 Csendes
(Continued)

FOREIGN PATENT DOCUMENTS

AU 199894207 B2 11/1998
CN 2040400 U 7/1989
(Continued)

OTHER PUBLICATIONS

Guangdong Midea White Home Appliance Technology Innovation Center Co., Ltd., et al., Extended European Search Report, EP Application No. 18932235.7, dated Sep. 20, 2021, 8 pgs.
(Continued)

*Primary Examiner* — Robert A Hopkins
(74) *Attorney, Agent, or Firm* — Morgan, Lewis & Bockius LLP

(57) ABSTRACT

Disclosed are a capture device for purifying air, a purification device, and an air purifier. The capture device for purifying air includes: a housing and a capture assembly. The housing is provided with an air inlet and an air outlet, wherein a cavity, in communication with the air inlet and the air outlet, is defined inside the housing; and the capture assembly is arranged in the cavity, and is located between the air inlet and the air outlet. The capture assembly includes
(Continued)

a first rotating disk, a second rotating disk and a cylinder, wherein both the first rotating disk and the second rotating disk are rotatable and rotate in opposite directions; and the cylinder is disposed between the first rotating disk and the second rotating disk.

20 Claims, 2 Drawing Sheets

(51) Int. Cl.
    *B01D 45/14*     (2006.01)
    *F24F 8/125*     (2021.01)
    *F24F 8/183*     (2021.01)
    *F24F 8/80*     (2021.01)
    *B01D 47/02*     (2006.01)
    *B01D 47/06*     (2006.01)
    *B01D 50/40*     (2022.01)
    *B01D 33/15*     (2006.01)
    *B01D 33/42*     (2006.01)

(52) U.S. Cl.
    CPC ............. *B01D 47/06* (2013.01); *B01D 50/40* (2022.01); *F24F 8/125* (2021.01); *F24F 8/183* (2021.01); *F24F 8/80* (2021.01)

(56) References Cited

U.S. PATENT DOCUMENTS

| | | | | |
|---|---|---|---|---|
| 6,203,763 B1 * | 3/2001 | Theiler | ................. | B01D 50/40 |
| | | | | 422/177 |
| 6,217,637 B1 * | 4/2001 | Toney | ................. | B01D 33/073 |
| | | | | 55/284 |
| 9,303,894 B2 * | 4/2016 | Vartiainen | ............... | F24F 13/06 |

FOREIGN PATENT DOCUMENTS

| | | |
|---|---|---|
| CN | 2221173 Y | 2/1996 |
| CN | 1376091 A | 10/2002 |
| CN | 2660373 Y | 12/2004 |
| CN | 101056688 A | 10/2007 |
| CN | 201055736 Y | 5/2008 |
| CN | 201132076 Y | 10/2008 |
| CN | 204017580 U | 12/2014 |
| CN | 106051945 A | 10/2016 |
| CN | 206959230 U | 2/2018 |
| CN | 207661867 U | 7/2018 |
| FR | 1324788 A | 4/1963 |
| JP | H05137934 A | 6/1993 |
| JP | H 1157520 A | 3/1999 |
| JP | H 11512343 A | 10/1999 |
| WO | WO2017206122 A1 | 12/2017 |

OTHER PUBLICATIONS

International Search Report and Written Opinion, PCT/CN2018/122107, dated May 17, 2019, 8 pgs.
Guangdong Midea White Household Appliances Technology Innovation Center Co. Ltd., First Office Action, CN2101811013330.9, dated Jul. 3, 2020, 13 pgs.
Midea Group Co., Ltd., First JP Office Action, JP Patent Application No. 2021-522117, dated Feb. 28, 2022, 5 pgs.
Midea Group Co., Ltd., Written Opinion, PCT/CN2018/122107, dated May 17, 2019, 4 pgs.

* cited by examiner

CAPTURE DEVICE FOR PURIFYING AIR, PURIFICATION DEVICE AND AIR PURIFIER

CROSS-REFERENCE TO RELATED APPLICATION

This application is a continuation application of PCT International Application Serial No. PCT/CN2018/122107, filed Dec. 19, 2018, which claims priority to Chinese Patent Application No. 201811013330.9, filed on Aug. 31, 2018, each of which is hereby incorporated by reference in its entirety.

TECHNICAL FIELD

The disclosure relates to the field of household electric appliances, and particularly relates to a capture device for purifying air, a purification device provided with the capture device for purifying air, and an air purifier.

BACKGROUND

Air purifiers are configured to purify air to improve the air quality. In most of air purifiers in related technologies, filtering devices are used to directly purify the air. For example, a filter sieve or an adsorption device can filter or adsorb dust in the air, the structure is complicated, and the purification effect is poor.

SUMMARY

The disclosure aims to solve at least one of the technical problems in the prior art.

Therefore, one objective of the disclosure is to provide a capture device for purifying air. The capture device for purifying air is simple in structure and good in purification effect.

The disclosure further provides a purification device for purifying air, which includes the capture device.

The disclosure further provides an air purifier including the purification device for purifying air.

The capture device for purifying air according to the embodiment of the first aspect of the disclosure includes a housing and a capture member. The housing is provided with an air inlet and an air outlet, a cavity, in communication with the air inlet and the air outlet, is defined in the housing, and the capture member is arranged in the cavity and located between the air inlet and the air outlet. The capture member includes: rotary disks and a cylinder. The rotary disks are provided with meshes, the rotary disks include a first rotary disk and a second rotary disk, the first rotary disk and the second rotary disk are rotatable in opposite directions with respect to one another, The first rotary disk is provided with a first mesh, the second rotary disk is provided with a second mesh, and the second rotary disk is arranged downstream of the first rotary disk and is spaced apart from the first rotary disk in an axial direction. The cylinder is arranged between the first rotary disk and the second rotary disk, and the outer peripheral wall of the cylinder is a cylindrical surface and is spaced apart from the side wall of the housing.

In the capture device for purifying air according to the embodiments of the disclosure, the air filtered by washing may be further purified and filtered through the capture member, so that the air flowing out of the air outlet is cleaner. Furthermore, since the first rotary disk and the second rotary disk rotate in opposite directions and have opposite shearing actions, a region between the first rotary disk and the second rotary disk will generate a counteracting effect on the air movement in a circumferential direction, so that the circumferential movement speed of the air in this region is reduced. Due to the high density of droplets carried in the air, the inertial force is much larger than that of gas, and then, the droplets will continue to perform a centrifugal movement, so that the liquid may be easily separated, and the purification effect may be improved. Therefore, the capture device for purifying air is simple in structure and good in purification effect.

In addition, the capture device for purifying air according to the embodiments of the disclosure may also have the following additional technical features:

According to some embodiments of the disclosure, at least a portion of the first rotary disk between the cylinder and the housing in a radial direction is formed with the first mesh, and at least a portion of the second rotary disk between the cylinder and the housing in the radial direction is formed with the second mesh.

According to some embodiments of the disclosure, at least one axial end of the cylinder is formed as an open structure, and the meshes are absent in an area of the rotary disks corresponding to the open structure in the axial direction.

According to some embodiments of the disclosure, each end of the cylinder is formed as a closed structure.

In some examples, the cylinder is rotatably arranged between the first rotary disk and the second rotary disk.

In some examples, the cylinder is fixedly connected to one of the first rotary disk and the second rotary disk.

In some examples, the cylinder is connected to the second rotary disk, the second rotary disk forms an annular disk, and the inner peripheral edge of the annular disk is connected to the outer peripheral wall of the cylinder.

According to some embodiments of the disclosure, the cylinder is fixedly arranged between the first rotary disk and the second rotary disk and is not connected to the first rotary disk and the second rotary disk.

According to some embodiments of the disclosure, the capture device for purifying air may further include: a first driving element and a second driving element. The first driving element drives the first rotary disk into rotation, and the second driving element drives the second rotary disk into rotation.

In some examples, the first rotary disk is arranged below the second rotary disk and is arranged opposite to the second rotary disk in an vertical direction, the first driving element is arranged below the first rotary disk, and the second driving element is arranged above the second rotary disk.

According to some embodiments of the disclosure, the capture device for purifying air may further include: a driving assembly. The driving assembly is respectively connected to the first rotary disk and the second rotary disk, the driving assembly includes a driving device and a reverse device, and the driving device is connected to at least one of the first rotary disk and the second rotary disk through the reverse device to enable the first rotary disk and the second rotary disk to rotate in opposite directions.

According to some embodiments of the disclosure, both the first rotary disk and the second rotary disk are of a wire-mesh structure.

The disclosure further provides a purification device for purifying air.

The purification device for purifying air according to the embodiment of the second aspect of the disclosure includes the capture device for purifying air in the above embodiment and a washing and purifying assembly. The washing and purifying assembly is arranged in the cavity and located between the air inlet and the first rotary disk and is configured to wash and purify the air entered through the air inlet.

In the purification device for purifying air according to the embodiments of the disclosure, by means of the capture device for purifying air in the above embodiment, the air purification effect may be improved, and the water content in the air may be reduced.

The disclosure further provides an air purifier provided with the purification device for purifying air in the above embodiment.

In the air purifier according to the embodiment of the third aspect of the disclosure, by means of the purification device for purifying air in the above embodiment, the air may be purified better, and particulate pollutants with a diameter greater than or equal to 1 μm and some gaseous pollutants may be removed, so that the air discharged from the air outlet is cleaner. Furthermore, droplets in the air filtered by washing may be prevented from entering a filtering device arranged downstream, such as a High Efficiency Particulate Air Filter (HEPA). In this way, the burden of a posterior filtering device may be greatly reduced, and the water content of the air may also be reduced to prevent breeding of bacteria in the HEPA after being soaked by water, so that the service life and purification effect of the posterior filtering device may be ensured.

The additional aspects and advantages of the disclosure will be partially given in the following description, and parts will become obvious from the following description, or be understood through the practice of the disclosure.

BRIEF DESCRIPTION OF THE DRAWINGS

The above and/or additional aspects and advantages of the disclosure will become obvious and easy to understand from the description of the embodiments in conjunction with the following drawings, wherein.

Figure 1:
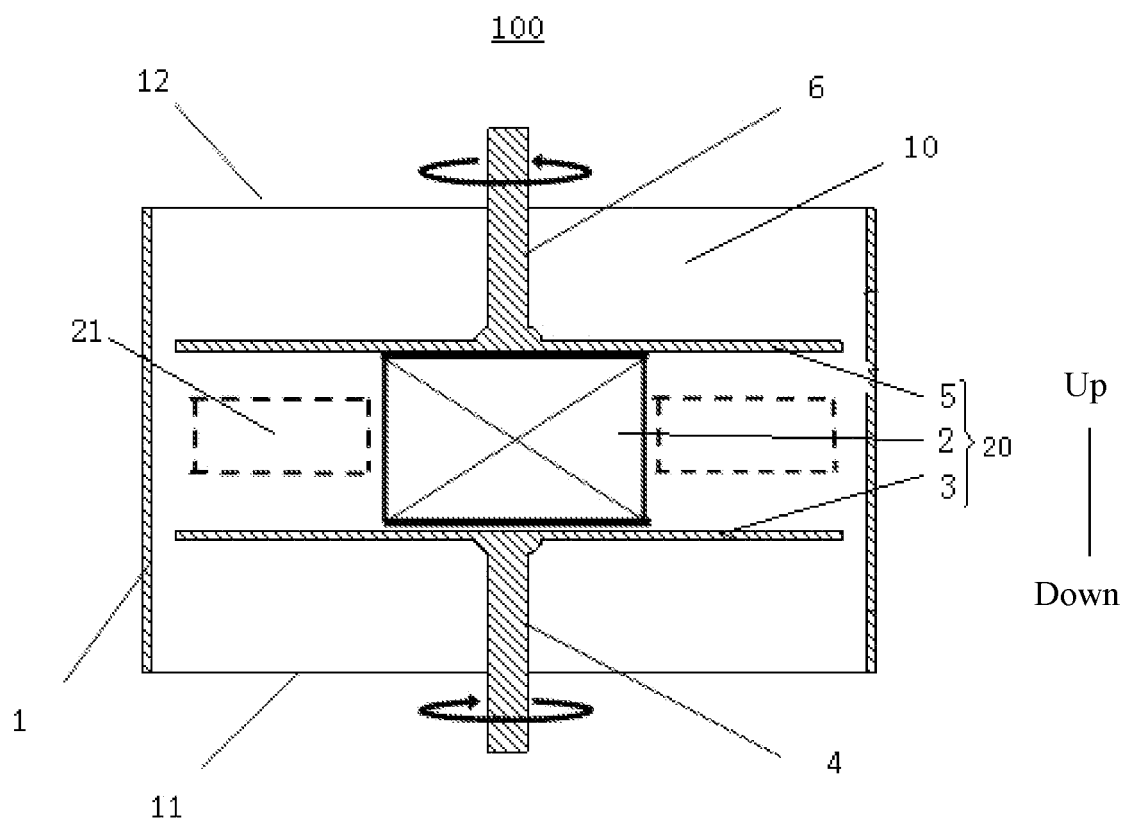
FIG. 1 is a cross-sectional diagram of a capture device for purifying air according to an embodiment of the disclosure.

List of Reference Numerals:

100: capture device for purifying air;
1: housing; 10: cavity; 11: air inlet; 12: air outlet;
20: capture member; 21: interval space;
2: cylinder;
3: first rotary disk; 31: first mesh;
4: first driving element;
5: second rotary disk; 51: second mesh;
6: second driving element.

DETAILED DESCRIPTION

The embodiments of the disclosure are described in detail below. Examples of the embodiments are shown in the drawings, and the same or similar reference numerals indicate the same or similar components or components having the same or similar functions throughout. The embodiments described below with reference to the drawings are exemplary, and are only intended to explain the disclosure, and should not be construed as limiting the disclosure.

A purification device for purifying air according to embodiments of the disclosure will be described below with reference to the drawings.

The purification device for purifying air according to the embodiments of the disclosure may include a capture device and a washing and purifying assembly. The washing and purifying assembly may be configured to wash and purify the air to perform primary purification of the air.

The washing and purifying assembly may be an immersion assembly allowing the air to enter water, or the washing and purifying assembly may be a water spraying and cleaning assembly or an atomized water cleaning assembly. The air filtered by washing will contain a certain amount of droplets to be removed, and may also contain some particles which are not removed thoroughly and toxic and harmful gases.

After the air is filtered by washing, some droplets will flow to the downstream side along with the air, and the air still contains a certain amount of particles and toxic and harmful gases which are not removed. Therefore, it is necessary to further remove the droplets, particles and toxic and harmful gases in the air so as to further improve the air purification effect.

The capture device is arranged downstream of the washing and purifying assembly, configured to purify the air filtered by washing, and can reduce the water content of the air.

A capture device 100 for purifying air according to the embodiments of the disclosure will be described below with reference to FIG. 1 and FIG. 2.

Figure 2:
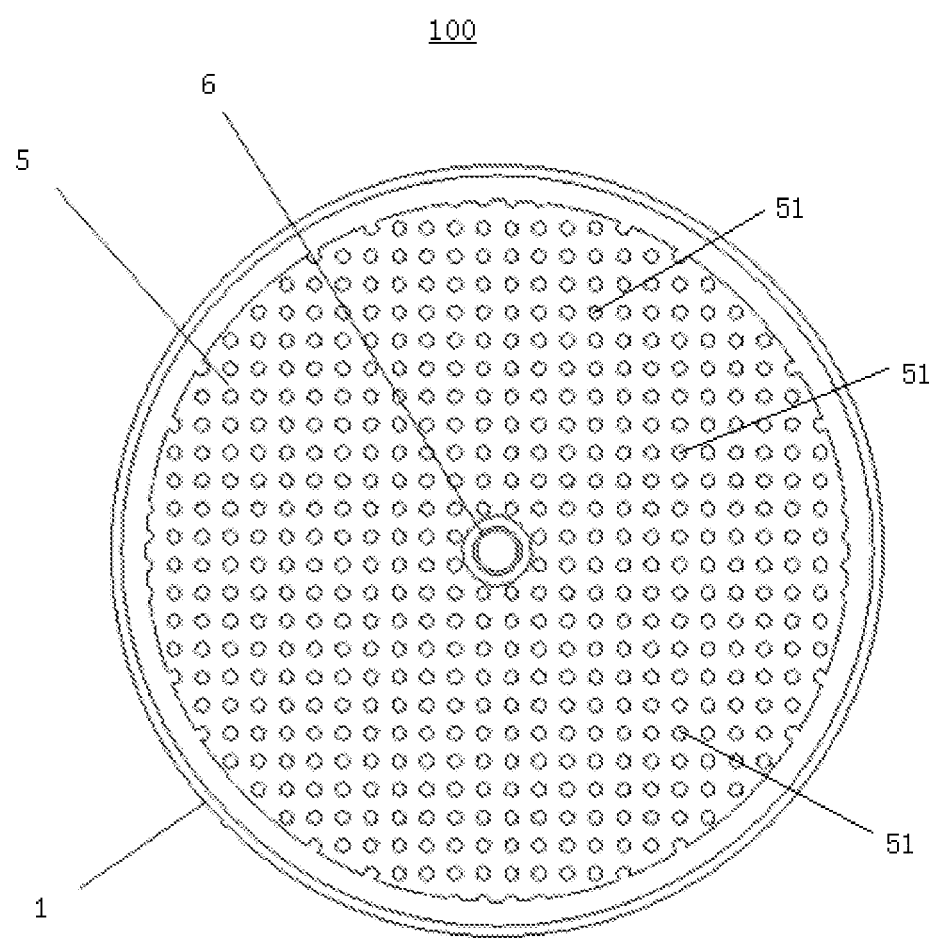
FIG. 2 is a schematic structural diagram of a capture device for purifying air according to an embodiment of the disclosure, seen from another angle.

As shown in FIG. 1 and FIG. 2, the capture device 100 for purifying air according to the embodiments of the disclosure may include a housing 1 and a capture member 20.

Specifically, the housing 1 is provided with an air inlet 11 and an air outlet 12, a cavity 10 in communication with the air inlet 11 and the air outlet 12 is defined in the housing 1, and a washing and purifying assembly is arranged in the cavity 10. In this way, the air may enter the cavity 10 from the air inlet 11 and then flow out through the air outlet 12, and the air may be purified in the cavity 10 by washing. By filtering the air through washing, most particles and toxic and harmful gases in the air can be captured.

The capture member 20 is arranged in the cavity 10 and is located between the air inlet 11 and the air outlet 12. Droplets in the air may be captured through the capture member 20. In this process, the contact between the droplets and the dust particles in the air may also be intensified, thereby not only reducing the water content of the air, but also improving the purification effect.

The capture member 20 includes rotary disks and a cylinder 2. The rotary disks are provided with meshes. The rotary disks include a first rotary disk 3 and a second rotary disk 5. The first rotary disk 3 and the second rotary disk 5 are rotatable, and the first rotating disc 3 and the second rotating disc 5 may rotate in opposite directions with respect to one another. In other words, both the first rotary disk 3 and the second rotary disk 5 are rotatably arranged in the cavity 10, and the rotation direction of the first rotary disk 3 is opposite to the rotation direction of the second rotary disk 5. For example, the first rotary disk 3 may rotate along a clockwise direction, and the second rotary disk 5 may rotate along a counterclockwise direction; or the first rotary disk 3 may rotate along a counterclockwise direction, and the second rotary disk 5 may rotate along a clockwise direction.

The first rotary disk 3 is provided with at least one first mesh 31, the second rotary disk 5 is provided with at least one second mesh 51. The second rotary disk 5 is arranged downstream of the first rotary disk 3 and is spaced apart from the first rotary disk 3 in an axial direction. In other words, in the air flow direction from the air inlet 11 to the air outlet 12, the first rotary disk 3 and the second rotary disk 5 are arranged in sequence, and the air flows through the first rotary disk 3 and the second rotary disk 5 sequentially.

The air may be primarily filtered through the first rotary disk 3 to capture a part of droplets in the air. Specifically, the air filtered by washing flows to the first rotary disk 3. Since the first rotary disk 3 rotates at a high speed, the shearing force generated by the high-speed rotation of the first rotary disk 3 may drive the air to generate a centrifugal movement, and before the air contacts the first rotary disk 3, a part of droplets in the air may be separated from the air. Smaller droplets contained in the air filtered by washing will continue to flow with the air and flow to the first rotary disk 3. When the air flows through the first rotary disk 3, the droplets in the air contact the first rotary disk 3. The droplets may be spread into a thin liquid film layer or atomized into tiny droplets on the first rotary disk 3 having a plurality of first meshes 31, the thin liquid film layer or the atomized tiny droplets collide strongly with the air passing through the gap of the first rotary disk 3, thereby further increasing the air-liquid contact area. At the same time, the spread liquid film also has a more efficient capture effect on the dust particles contained in the air to further strengthen the dust removal. Furthermore, the first rotary disk 3 may also drive the air to continue to flow downstream, thereby improving the fluidity.

The first rotary disk 3 and the second rotary disk 5 are spaced apart in the air circulation direction. The air which is primarily purified and captured by the first rotary disk 3 flows between the first rotary disk 3 and the second rotary disk 5. Since the first rotary disk 3 and the second rotary disk 5 rotate in opposite directions, the shearing forces generated by the first rotary disk 3 and the second rotary disk 5 are opposite, and the air is affected by acting forces in opposite directions when flowing between the first rotary disk 3 and the second rotary disk 5. As a result, the movement of the air in the interval space 21 along the circumferential direction generates a certain counteracting effect, thereby reducing the circumferential movement speed of the air. The density of the droplets carried in the air is larger, and the inertial effect of the droplets is greater than that of gas, so that the movement of the droplets changes less than that of the air. That is, due to the inertial effect, the droplets in the air will continue to perform a centrifugal movement, and the inertial effect of gas is smaller than that of liquid, so that the gas and liquid are easier to separate, and the gas-liquid separation effect is improved.

The air continues to flow to the second rotary disk 5. The second rotary disk 5 may further filter the air to capture the liquid in the air, thereby realizing multi-stage separation to improve the purification effect. Furthermore, the second rotary disk 5 may also accelerate the filtered air to perform a centrifugal movement to improve the purification effect, and may provide power for the air to flow to the air outlet 12. The purification of the air and the capture of the droplets by the second rotary disk 5 are the same as those of the first rotary disk 3, and will not be repeated here.

The cylinder 2 is arranged between the first rotary disk 3 and the second rotary disk 5, and the outer peripheral wall of the cylinder 2 is a cylindrical surface and is spaced apart from the side wall of the housing 1. In other words, the outer peripheral wall of the cylinder 2 forms a closed wall surface, and the inside of the cylinder 2 is not communicated with the outside of the cylinder 2. For example, the cylinder 2 may form a structure that is airtight and watertight. As shown in FIG. 1, the cylinder 2 is spaced apart from the side wall of the housing 1 to define an interval space 21, and the air may circulate in the interval space 21. Since the circumferential speed of the air in the central axis region of the first rotary disk 3 and the second rotary disk 5 is small, the separation effect is poor. By disposing the cylinder 2, the air may be prevented from flowing through the region near the central axis of the first rotary disk 3 and the second rotary disk 5, thereby improving the gas-liquid separation effect to improve the purification effect.

In the capture device 100 for purifying air according to the embodiments of the disclosure, the air filtered by washing may be further purified and filtered through the capture member 20, so that the air flowing out of the air outlet 12 is cleaner. Since the first rotary disk 3 and the second rotary disk 5 rotate in opposite directions and are opposite in shearing action, the air is affected by the acting forces in different directions when flowing between the first rotary disk 3 and the second rotary disk 5, so as to reduce the circumferential movement speed of the air. Due to the high density of the droplets carried in the air, the inertial force of the droplets is much larger than that of gas, and the droplets will continue to perform a centrifugal movement. The inertial effect of gas is smaller than that of liquid, so that the droplets are easier to separate out. Therefore, the capture device 100 for purifying air is simple in structure and good in air purification effect.

In the purification device for purifying air according to the embodiments of the disclosure, the capture device is the capture device 100 for purifying air in the above embodiment, and the washing and purifying assembly is arranged in the cavity 10 and located between the air inlet 11 and the first rotary disk 3 and is configured to purify the air entered through the air inlet 11, by washing. In this way, the air may enter the cavity 10 from the air inlet 11 and flow to the washing and purifying assembly, and the washing and purifying assembly may filter the air flowing through it by washing, so as to remove most of the particulate pollutants and toxic gases in the air. Then, the air filtered by washing flows to the first rotary disk 3, that is, the air filtered by washing may flow to the capture member, and the capture member may not only capture the droplets in the air filtered by washing to reduce the water content of the air, but also improve the purification effect.

The purification device of the disclosure may be applied to the field of household air purification. The purification device of the disclosure may remove particulate pollutants with a diameter greater than or equal to 1 μm and some gaseous pollutants, so that the air discharged from the air outlet 12 is cleaner. Moreover, in the prior art, most of household air purification devices are internally provided with filtering devices, such as the HEPA. In the disclosure, the droplets in the air are captured through the capture member 20 to reduce the water content of the air, thereby preventing the droplets in the air filtered by washing from entering the filtering device and the like on the downstream side. In this way, the burden of a posterior filtering device may be greatly reduced, and the water content of the air may also be reduced to prevent breeding of bacteria in the filtering device after being soaked by water, so that the service life and purification effect of the posterior filtering device may be ensured, and cleaner air may be discharged from the air outlet 12.

The first rotary disk 3 and the second rotary disk 5 may operate at a low rotation speed. In the case of a lower rotation speed, this not only facilitates the separation of the air and the droplets in the air, but also enables the capture device 100 for purifying air to have better structural stability and low energy consumption, and may better reduce noise.

In some examples, the cylinder 2 may be of a hollow structure and form a cylindrical airtight element, so that the weight of the capture device 100 for purifying air may be reduced, and the manufacturing material of the cylinder 2 may also be saved so as to save the production cost.

In the description of the disclosure, it should be understood that the orientation or position relationship indicated by the terms "upper" and "lower" is the orientation or position relationship based on the drawings, and is only for the convenience of describing the disclosure and simplifying the description.

In some embodiments of the disclosure, the first meshes 31 may be at least arranged on the portion of the first rotary disk 3 between the cylinder 2 and the housing 1 in a radial direction, and the second meshes 51 may be at least arranged on the portion of the second rotary disk 5 between the cylinder 2 and the housing 1 in a radial direction. Specifically, as shown in FIG. 1, in the air circulation direction (that is, the up-down direction as shown in FIG. 1), the first meshes 31 may be arranged on the portion of the first rotary disk 3 corresponding to the interval space 21, and the second meshes 51 may be arranged on the portion of the second rotary disk 5 corresponding to the interval space 21, so that the air may flow between the first meshes 31, the interval space 21 and the second meshes 51. Accordingly, the flow of the air is facilitated, the circulation area of the air is ensured, and the air resistance may also be reduced, so that the droplets contained in the air may be separated out as much as possible. Regarding the structure of the rotary disk, the meshes may be distributed on the whole rotary disk or may be arranged only on the portion of the rotary disk between the cylinder 2 and the housing 1.

In some embodiments of the disclosure, at least one axial end of the cylinder 2 is formed as an open structure. That is, the cylinder 2 may be formed as a structure with one open end and one closed end in an axial direction, and the cylinder 2 may also be formed as a structure with two open ends. The meshes are absent in an area of the rotary disks corresponding to the open structure in the axial direction.

In some specific examples of the disclosure, the cylinder 2 may form a structure with an open lower end and a closed upper end. The meshes are absent at the portion of the first rotary disk 3 corresponding to the opening of the cylinder 2. That is, the first meshes 31 are only arranged on the portion of the first rotary disk 3 between the cylinder 2 and the housing 1, and the center position of the first rotary disk 3 is not provided with meshes, so as to close the opening of the lower end of the cylinder 2. At this time, since the upper end of the cylinder 2 is closed, the portion of the second rotary disk 5 corresponding to the cylinder 2 may or may not be provided with meshes.

Alternatively, the upper end of the cylinder 2 may form an open structure. The meshes are absent at the portion of the second rotary disk 5 corresponding to the open structure of the cylinder 2, so as to close the opening of the upper end of the cylinder 2. The second meshes 51 may be only arranged on the portion of the second rotary disk 5 between the housing 1 and the cylinder 2. At this time, the first rotary disk 3 corresponds to the lower end of the cylinder 2, and the position of the first rotary disk 3 corresponding to the closed structure of the cylinder 2 may or may not be provided with meshes.

In some other examples of the disclosure, both ends of the cylinder 2 are open. At this time, the meshes are absent in areas of the first rotary disk 3 and the second rotary disk 5 corresponding to the open structures of the cylinder 2. That is, the center portions of both the first rotary disk 3 and the second rotary disk 5 are not provided with meshes, the first meshes 31 are only arranged on the portion of the first rotary disk 3 between the cylinder 2 and the housing 1, and the second meshes 51 are only arranged on the portion of the second rotary disk 5 between the housing 1 and the cylinder 2.

In some other embodiments of the disclosure, each end of the cylinder 2 is formed as a closed structure. At this time, the meshes are provided or absent in areas of the first rotary disk 3 and the second rotary disk 5 corresponding to the cylinder 2 in the axial direction. That is, the first meshes 31 may be distributed on the whole first rotary disk 3 or may be only arranged on the portion of the first rotary disk 3 between the cylinder 2 and the housing 1, and the second meshes 51 may be distributed on the whole second rotary disk 5 or may be only arranged on the portion of the second rotary disk 5 between the housing 1 and the cylinder 2.

Regarding the structure of the first rotary disk 3 and the second rotary disk 5, the first rotary disk 3 and the second rotary disk 5 may be formed in a ring shape or a disk shape, the first meshes 31 are evenly distributed on the first rotary disk 3, and the second meshes 51 are evenly distributed on the second rotary disk 5. Therefore, the first rotary disk 3 and the second rotary disk 5 may be in the form of a mesh structure, so as to simplify the production process of the first rotary disk 3 and the second rotary disk 5. Of course, it can be understood that the first meshes 31 and the second meshes 51 may also be unevenly distributed.

In some embodiments of the disclosure, the cylinder 2 may be fixedly arranged between the first rotary disk 3 and the second rotary disk 5 and is not connected to the first rotary disk 3 and the second rotary disk 5. That is, the cylinder 2 is fixedly arranged and may not rotate, and the cylinder 2 may be provided with a separate support structure.

In some other embodiments of the disclosure, the cylinder 2 is rotatably arranged between the first rotary disk 3 and the second rotary disk 5. When air flows between the first rotary disk 3 and the second rotary disk 5, the cylinder 2 rotates at a high speed and generates a shearing force, so that the effect of centrifugal movement of the air may be enhanced to further improve the gas-liquid separation effect.

In some examples, the cylinder 2 is fixedly connected to one of the first rotary disk 3 and the second rotary disk 5. In other words, in some examples of the disclosure, the cylinder 2 may be fixedly connected to the first rotary disk 3, and the first rotary disk 3 drives the cylinder 2 into rotation, that is, the first rotary disk 3 and the cylinder 2 rotate synchronously. In some other examples of the disclosure, the cylinder 2 is fixedly connected to the second rotary disk 5, the second rotary disk 5 drives the cylinder 2 into rotation, and the second rotary disk 5 and the cylinder 2 rotate synchronously. Therefore, there is no need to dispose a separate driving structure, and the structure is simple and easy to assemble. For the assembly of the cylinder 2 with the first rotary disk 3 or the second rotary disk 5, the cylinder 2 may be in clamped connection or screw connection with or may be welded with the first rotary disk 3 or the second rotary disk 5, which is not limited in the disclosure.

Of course, it can be understood that the cylinder 2 may also be not connected to the first rotary disk 3 and the second rotary disk 5, the capture device 100 for purifying air may be provided with a separate driving structure to drive the cylinder 2 into rotation, or the cylinder 2 may be connected to a first driving element 4 or a second driving element 6 through other connecting components.

In some specific examples of the disclosure, as shown in FIG. 1, the cylinder 2 is connected to the second rotary disk 5, the second rotary disk 5 forms an annular disk, and the inner side wall of the annular disk is connected to the outer peripheral wall of the cylinder 2. In other words, the second rotary disk 5 is formed in an annular shape, the second rotary disk 5 may be arranged around the outer side of the cylinder 2, and the inner side wall of the second rotary disk 5 is fixedly connected to the outer side wall of the cylinder 2, so that the fixed assembly of the cylinder 2 and the second rotary disk 5 is facilitated, and the structure is simple and easy to assemble. Of course, it can be understood that the first rotary disk 3 may also forms an annular disk.

In some examples, the first rotary disk 3 and the second rotary disk 5 may also be formed as circular discs. For example, both the first rotary disk 3 and the second rotary disk 5 may be formed as circular discs, and one of the two circular discs is located above the cylinder 2 and another one is located below the cylinder 2. Further, the first rotary disk 3 and the second rotary disk 5 may be two sheet-shaped rotary disks arranged directly opposite to each other. That is, both the first rotary disk 3 and the second rotary disk 5 may be formed in a sheet disk shape, and the first rotary disk 3 and the second rotary disk 5 are arranged to be directly opposite to each other in an vertical (up-down) direction and rotate in opposite directions.

Regarding the structure of the first rotary disk 3 and the second rotary disk 5, the first rotary disk 3 and the second rotary disk 5 may be of a wire-mesh structure, so that the first rotary disk 3 and the second rotary disk 5 are simple in structure and easy to produce and assemble, the capture member 20 may be configured to separate solid particles and the like contained in the air, and the first meshes 31 and the second meshes 51 are more evenly distributed, thereby being beneficial to the capture of the droplets and the passage of the air. Of course, it can be understood that the first rotary disk 3 and the second rotary disk 5 may also have other structural forms, such as a spoke structure and a profiled turntable structure, which are not limited in the disclosure.

In some embodiments of the disclosure, the capture device 100 for purifying air further includes a first driving element 4 and a second driving element 6, the first driving element 4 drives the first rotary disk 3 into rotation, and the second driving element 6 drives the second rotary disk 5 into rotation. In other words, the first driving element 4 and the second driving element 6 rotate in opposite directions to drive the first rotary disk 3 and the second rotary disk 5 to rotate in opposite directions. In this way, the first rotary disk 3 and the second rotary disk 5 are separately driven by adopting independent driving mechanisms respectively, so that the first rotary disk 3 and the second rotary disk 5 do not affect each other during rotating, and the stability is good.

In some embodiments of the disclosure, the first rotary disk 3 is arranged below the second rotary disk 5 and is arranged opposite to the second rotary disk 5 in an up-down direction, the first driving element 4 is arranged below the first rotary disk 3, and the second driving element 6 is arranged above the second rotary disk 5, so that the installation and assembly of the first driving element 4 and the second driving element 6 are facilitated, and the first driving element 4 and the second driving element 6 may be prevented from being corroded by droplets and dust, so as to ensure the safety and reliability of the first driving element 4 and the second driving element 6.

In some examples, the first driving element 4 and the second driving element 6 may also be sealed, so that the first driving element 4 and the second driving element 6 may be further prevented from being corroded by droplets and dust, so as to prolong the service life of the first driving element 4 and the second driving element 6.

In some other embodiments of the disclosure, the capture device 100 for purifying air further includes: a driving assembly. The driving assembly is respectively connected to the first rotary disk 3 and the second rotary disk 5, the driving assembly includes a driving device and a reverse device, and the driving device is connected to at least one of the first rotary disk 3 and the second rotary disk 5 through the reverse device to enable the first rotary disk 3 and the second rotary disk 5 to rotate in opposite directions. In other words, the first rotary disk 3 and the second rotary disk 5 may be driven by the same driving device, so that the first rotary disk 3 and the second rotary disk 5 may rotate at the same time.

Specifically, one of the first rotary disk 3 and the second rotary disk 5 may be connected to the driving device and driven by the driving device, and the other one of the first rotary disk 3 and the second rotary disk 5 may be connected to the driving device through the reverse device. For example, the first rotary disk 3 may be connected to the driving device and driven by the driving device, and the second rotary disk 5 may be connected to the reverse device to indirectly connect to the driving device, so that the driving device may drive the first rotary disk 3 into rotation, and may drive the reverse device to drive the second rotary disk 5 to rotate in a direction opposite to the direction of the first rotary disk 3. The reverse device may be a gear assembly or other devices as long as it may drive the second rotary disk 5 to rotate in a direction opposite to the direction of the first rotary disk 3, which is not limited in the disclosure.

The disclosure further provides an air purifier provided with the purification device for purifying air in the above embodiment.

In the air purifier according to the embodiments of the disclosure, by disposing the purification device for purifying air in the above embodiment, the air may be purified better, and particulate pollutants with a diameter greater than or equal to 1 μm and some gaseous pollutants may be removed, so that the air discharged from the air outlet 12 is cleaner. Furthermore, droplets in the air filtered by washing may be prevented from entering a filtering device arranged downstream, such as an HEPA. In this way, the burden of a posterior filtering device may be greatly reduced, and the moisture in the air may also be removed to prevent breeding of bacteria in the HEPA after being soaked by water, so that the service life and purification effect of the posterior filtering device may be ensured, and cleaner air may be discharged from the air outlet 12.

Other configurations and operations of the air purifier according to the embodiments of the disclosure are known to those of ordinary skill in the art, and will not be described in detail here.

In the description of this specification, the description referring to the terms "an embodiment", "some embodiments", "an exemplary embodiment", "an example", "a specific example", "some examples" and the like means that the specific features, structures, materials, or characteristics described in combination with the present embodiment or example are included in at least one of the embodiments or examples of the disclosure. In this specification, the schematic representation of the above terms does not necessarily refer to the same embodiment or example. Moreover, the described specific features, structures, materials, or characteristics may be combined in any suitable manner in any one or more embodiments or examples.

Although the embodiments of the disclosure have been shown and described, those of ordinary skill in the art may understand: various changes, modifications, replacements and variations can be made to these embodiments without departing from the principles and objectives of the disclosure, and the scope of the disclosure is defined by the claims and equivalents thereof.

What is claimed is:

1. A capture device for purifying air, comprising:
a housing provided with an air inlet and an air outlet, wherein a cavity in communication with the air inlet and the air outlet is defined in the housing; and
a capture member arranged in the cavity and located between the air inlet and the air outlet, wherein the capture member comprises a rotary disk and a cylinder, the rotary disk is provided with a mesh, the rotary disk comprises a first rotary disk and a second rotary disk, the first rotary disk and the second rotary disk are rotatable in opposite directions with respect to one another, the first rotary disk is provided with a first mesh, the second rotary disk is provided with a second mesh, the second rotary disk is arranged downstream of the first rotary disk and is spaced apart from the first rotary disk in an axial direction, the cylinder is arranged between the first rotary disk and the second rotary disk, and an outer peripheral wall of the cylinder is a cylindrical surface and is spaced apart from a side wall of the housing.

2. The capture device for purifying air of claim 1, wherein at least a portion of the first rotary disk between the cylinder and the housing in a radial direction is formed with the first mesh, and at least a portion of the second rotary disk between the cylinder and the housing in the radial direction is formed with the second mesh.

3. The capture device for purifying air of claim 2, wherein at least one axial end of the cylinder is formed as an open structure, and the mesh is absent in an area of the rotary disk corresponding to the open structure in the axial direction.

4. The capture device for purifying air of claim 2, wherein each end of the cylinder is formed as a closed structure.

5. The capture device for purifying air of claim 1, wherein the cylinder is rotatably arranged between the first rotary disk and the second rotary disk.

6. The capture device for purifying air of claim 5, wherein the cylinder is fixedly connected to one of the first rotary disk and the second rotary disk.

7. The capture device for purifying air of claim 6, wherein the cylinder is connected to the second rotary disk, the second rotary disk forms an annular disk, and an inner peripheral edge of the annular disk is connected to the outer peripheral wall of the cylinder.

8. The capture device for purifying air of claim 1, wherein the cylinder is fixedly arranged between the first rotary disk and the second rotary disk, and is not connected to the first rotary disk and the second rotary disk.

9. The capture device for purifying air of claim 1, further comprising:
a first driving element for driving the first rotary disk into rotation; and
a second driving element for driving the second rotary disk into rotation.

10. The capture device for purifying air of claim 9, wherein the first rotary disk is arranged below the second rotary disk and is arranged opposite to the second rotary disk in a vertical direction, the first driving element is arranged below the first rotary disk, and the second driving element is arranged above the second rotary disk.

11. The capture device for purifying air of claim 1, further comprising a driving assembly, wherein the driving assembly is connected to the first rotary disk and the second rotary disk, the driving assembly comprises a driving device and a reverse device, and the driving device is connected to at least one of the first rotary disk and the second rotary disk through the reverse device to enable the first rotary disk and the second rotary disk to rotate in opposite directions.

12. The capture device for purifying air of claim 1, wherein both the first rotary disk and the second rotary disk are of a wire-mesh structure.

13. A purification device for purifying air, comprising:
a capture device for purifying air, comprising:
a housing provided with an air inlet and an air outlet, wherein a cavity in communication with the air inlet and the air outlet is defined in the housing; and
a capture member arranged in the cavity and located between the air inlet and the air outlet, wherein the capture member comprises a rotary disk and a cylinder, the rotary disk is provided with a mesh, the rotary disk comprises a first rotary disk and a second rotary disk, the first rotary disk and the second rotary disk are rotatable in opposite directions with respect to one another, the first rotary disk is provided with a first mesh, the second rotary disk is provided with a second mesh, the second rotary disk is arranged downstream of the first rotary disk and is spaced apart from the first rotary disk in an axial direction, the cylinder is arranged between the first rotary disk and the second rotary disk, and an outer peripheral wall of the cylinder is a cylindrical surface and is spaced apart from a side wall of the housing; and
a washing and purifying assembly which is arranged in the cavity and located between the air inlet and the first rotary disk and is configured to wash and purify the air entered through the air inlet.

14. The purification device for purifying air of claim 13, wherein at least a portion of the first rotary disk between the cylinder and the housing in a radial direction is formed with the first mesh, and at least a portion of the second rotary disk between the cylinder and the housing in the radial direction is formed with the second mesh.

15. The purification device for purifying air of claim 14, wherein at least one axial end of the cylinder is formed as an open structure, and the mesh is absent in an area of the rotary disk corresponding to the open structure in the axial direction.

16. The purification device for purifying air of claim 14, wherein each end of the cylinder is formed as a closed structure.

17. The purification device for purifying air of claim 13, wherein the cylinder is rotatably arranged between the first rotary disk and the second rotary disk.

18. The purification device for purifying air of claim 17, wherein the cylinder is fixedly connected to one of the first rotary disk and the second rotary disk.

19. The purification device for purifying air of claim 18, wherein the cylinder is connected to the second rotary disk, the second rotary disk forms an annular disk, and an inner peripheral edge of the annular disk is connected to the outer peripheral wall of the cylinder.

20. An air purifier, comprising:
a purification device for purifying air, comprising:
a capture device for purifying air, comprising:
- a housing provided with an air inlet and an air outlet, wherein a cavity in communication with the air inlet and the air outlet is defined in the housing; and
- a capture member arranged in the cavity and located between the air inlet and the air outlet, wherein the capture member comprises a rotary disk and a cylinder, the rotary disk is provided with a mesh, the rotary disk comprises a first rotary disk and a second rotary disk, the first rotary disk and the second rotary disk are rotatable in opposite directions with respect to one another, the first rotary disk is provided with a first mesh, the second rotary disk is provided with a second mesh, the second rotary disk is arranged downstream of the first rotary disk and is spaced apart from the first rotary disk in an axial direction, the cylinder is arranged between the first rotary disk and the second rotary disk, and an outer peripheral wall of the cylinder is a cylindrical surface and is spaced apart from a side wall of the housing; and
a washing and purifying assembly which is arranged in the cavity and located between the air inlet and the first rotary disk and is configured to wash and purify the air entered through the air inlet.

* * * * *